March 22, 1932. W. UMONT 1,850,483
APPARATUS FOR RECOVERING WASTE OIL
Filed Dec. 6, 1930 4 Sheets-Sheet 1
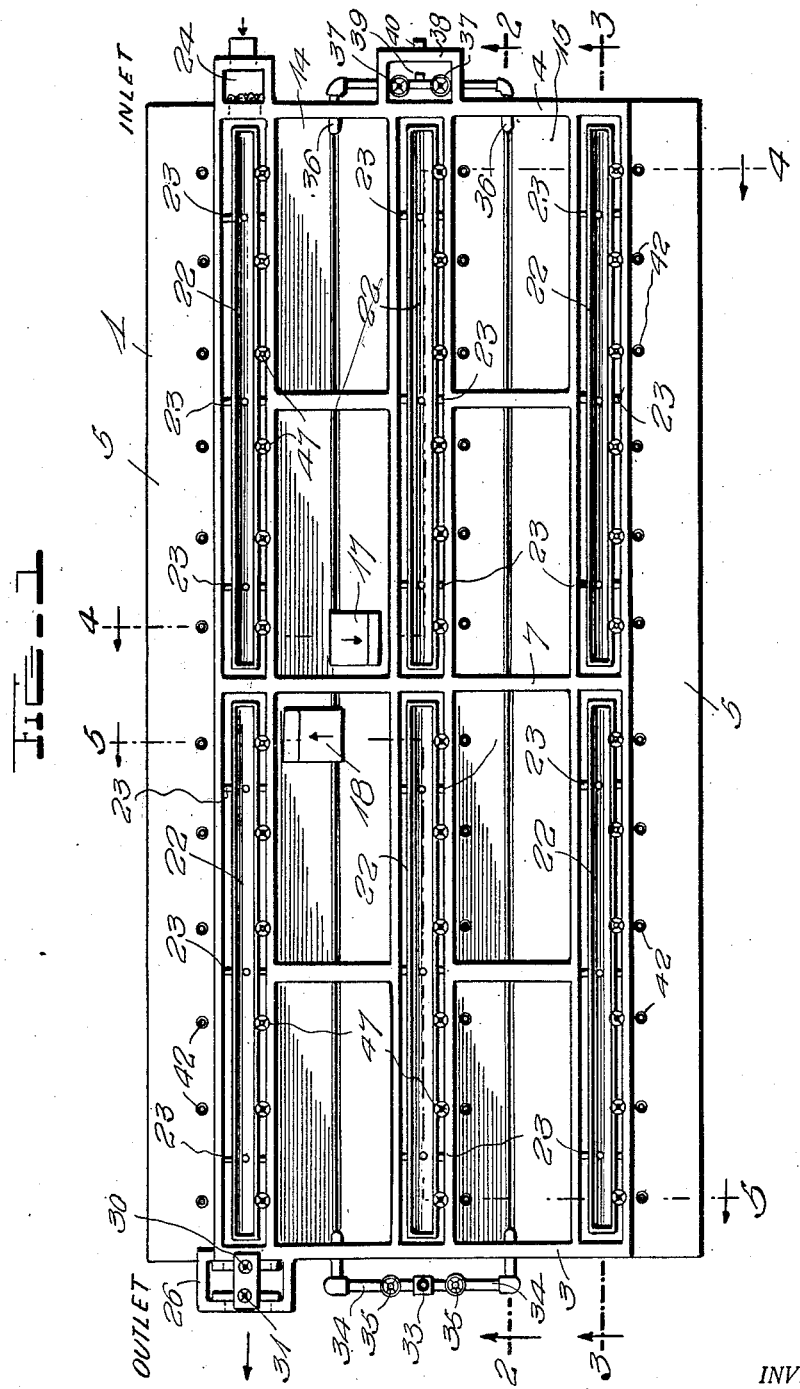
INVENTOR.
William Umont,
BY
Jacobi & Jacobi ATTORNEYS.

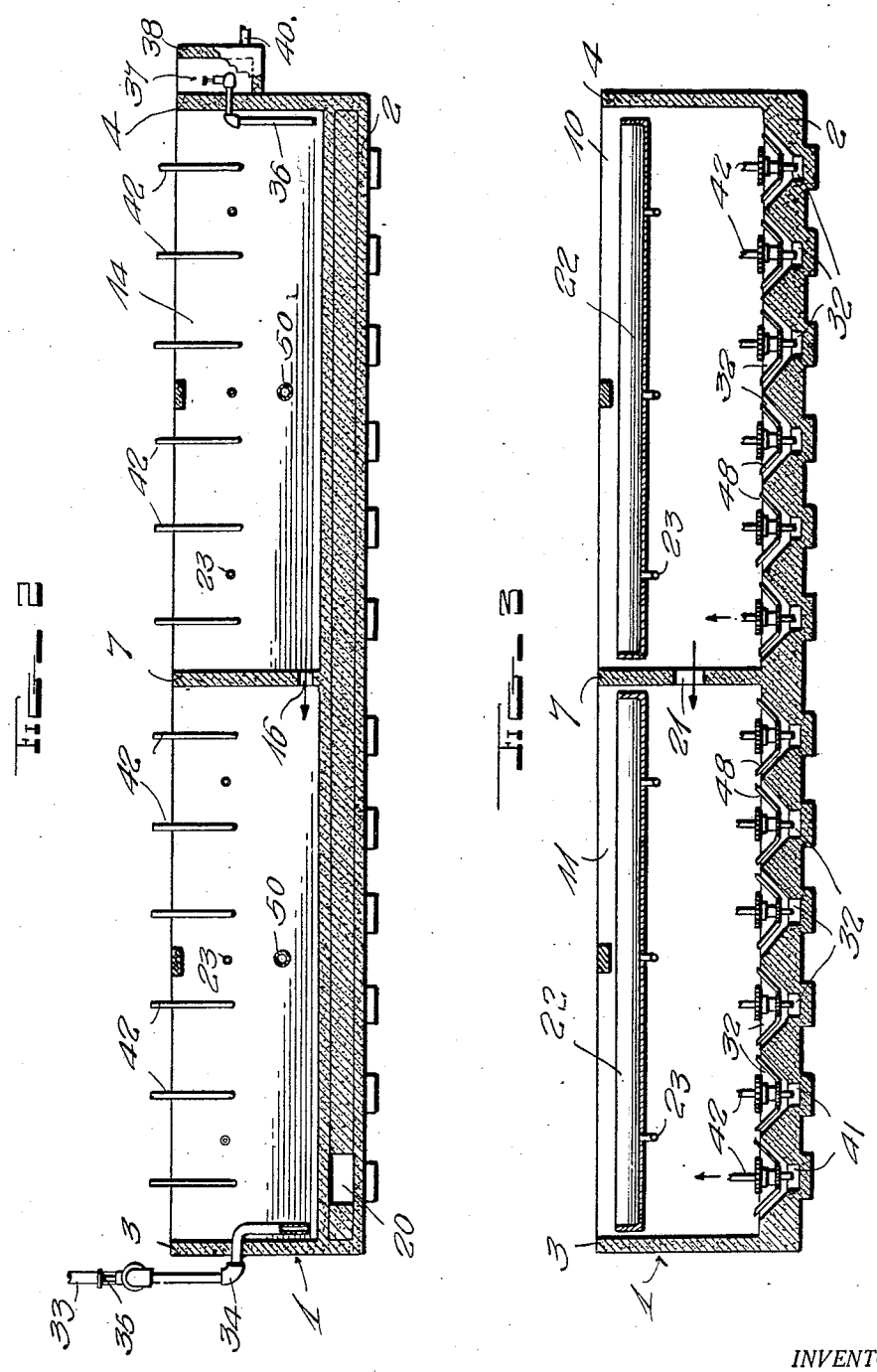

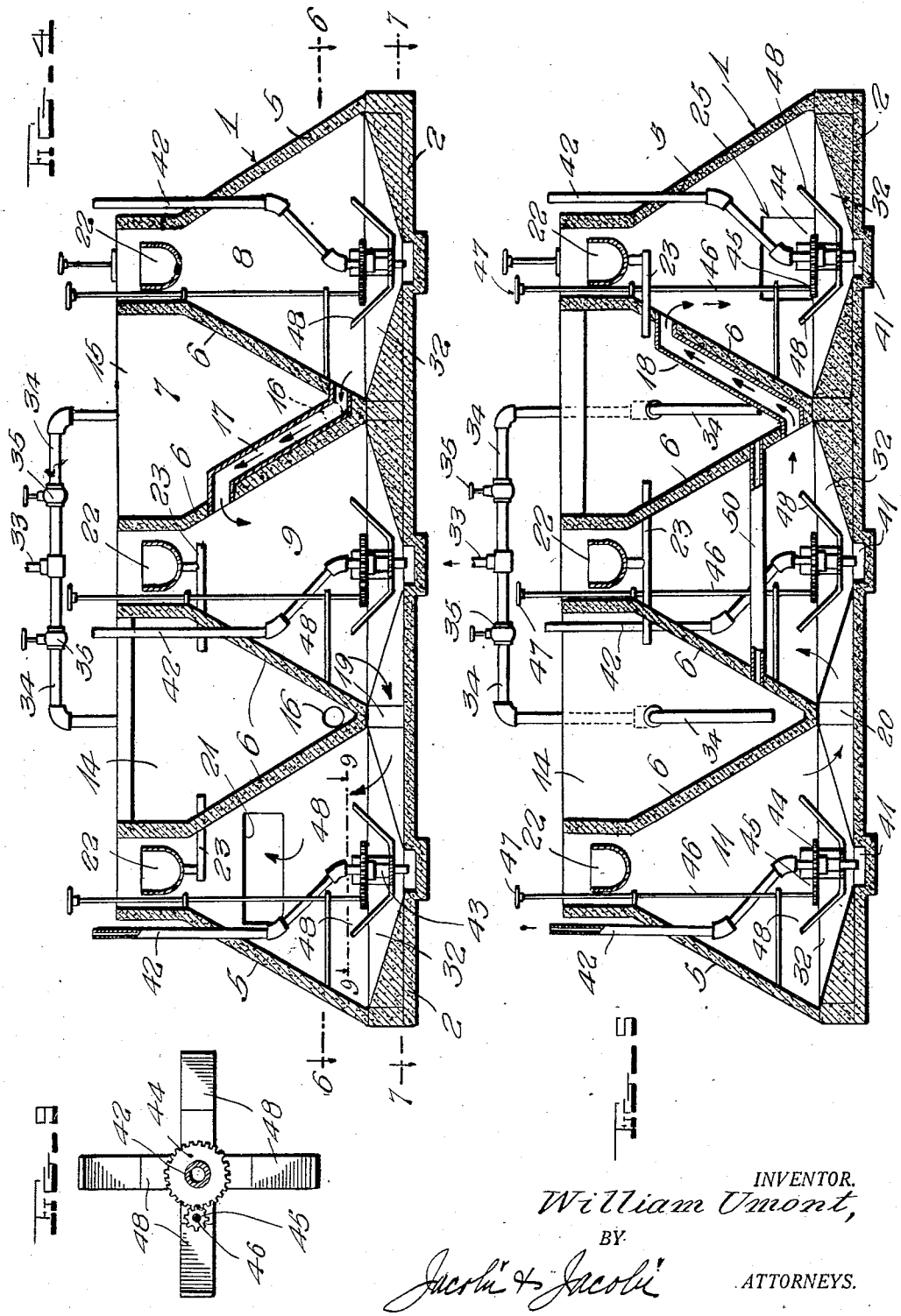

March 22, 1932. W. UMONT 1,850,483
APPARATUS FOR RECOVERING WASTE OIL
Filed Dec. 6, 1930 4 Sheets-Sheet 4
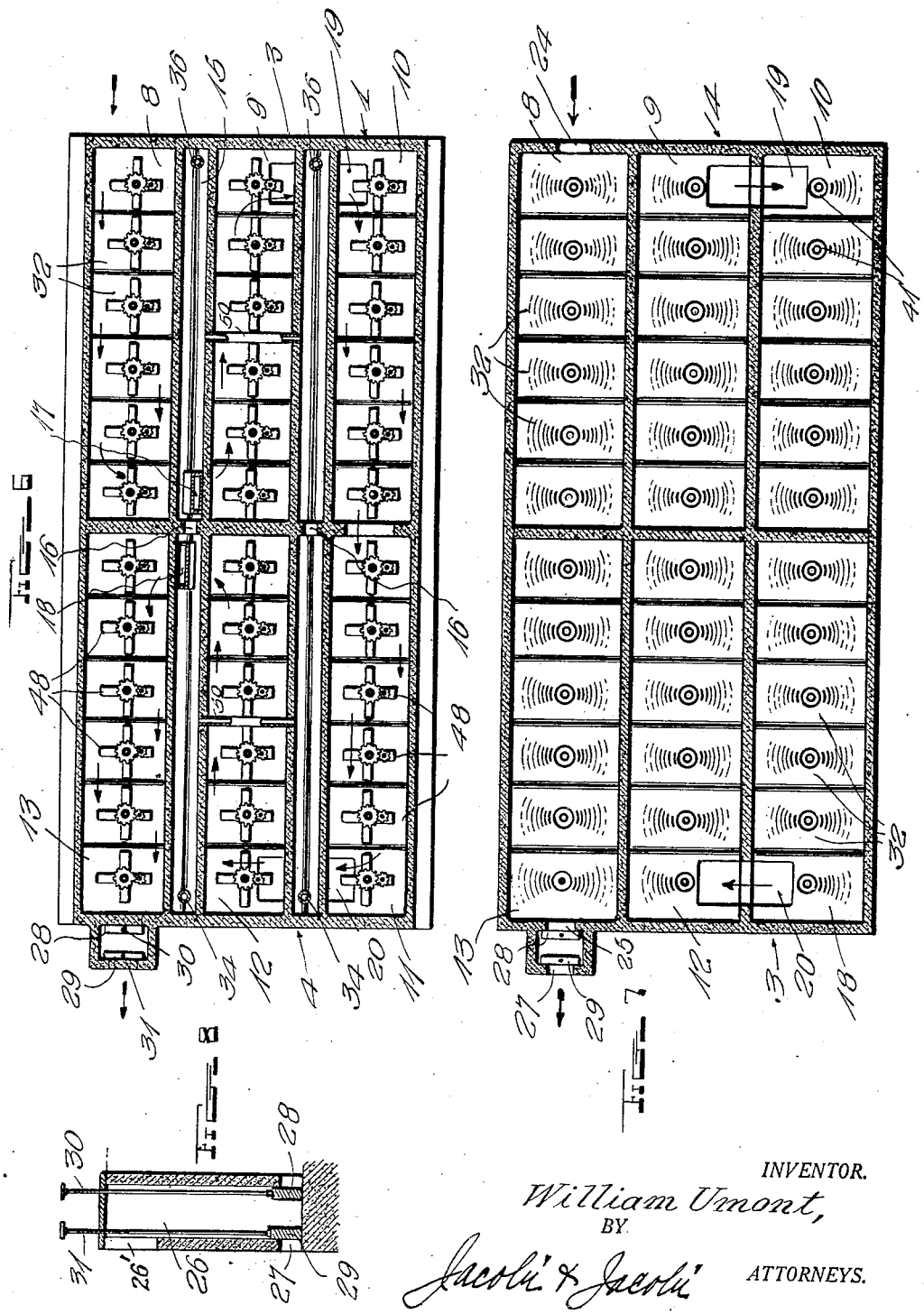
INVENTOR.
William Umont,
BY
Jacobi & Jacobi ATTORNEYS.

Patented Mar. 22, 1932

1,850,483

UNITED STATES PATENT OFFICE

WILLIAM UMONT, OF DUNELLEN, NEW JERSEY, ASSIGNOR OF ONE-HALF TO CARL W. ANDERSON, OF DUNELLEN, NEW JERSEY

APPARATUS FOR RECOVERING WASTE OIL

Application filed December 6, 1930. Serial No. 500,643.

This invention relates to an apparatus for recovering waste oil and one object of the invention is to provide an apparatus through the use of which waste oil which is present in large quantities around a refinery may be separated from water with which it has become intermingled thereby permitting recovery and use of oil which would otherwise be lost.

Another object of the invention is to provide a device of this character of such construction that it may be interposed intermediate the length of a conduit leading to a sewer, river or other body of water thereby permitting water washed or swept from the refinery and containing oil to be delivered directly into the sewer, river or other body of water after the oil has been recovered.

Another object of the invention is to so construct the apparatus that the oil laden water flows quietly through the apparatus and follows a tortuous course from one chamber to another thereby giving the oil an opportunity to rise to the surface of the water and preventing agitation of the water as its flows through the apparatus which would be liable to cause oil which has accumulated upon water in the apparatus to again become intermingled with the water.

Another object of the invention is to not only permit flow of water through the apparatus to be controlled but also allow the level of the water to be regulated thereby permitting oil which has accumulated upon the water to be raised to such a level that it may flow into troughs from which it is delivered into storage tanks forming part of the apparatus.

Another object of the invention is to permit water which may accidentally flow into the storage tanks with the oil and accumulates in the lower portions thereof to be extracted before the oil is pumped out of the tanks.

Another object of the invention is to so construct the apparatus that it may accommodate a large quantity of oil laden water and also provide storage facilities for a large quantity of oil.

Another object of the invention is to provide a device of this character wherein sand and other muck contained in the intermingled oil and water may accumulate in the bottoms of the chambers through which the water and oil passes and further permit this accumulated sand and muck to be pumped out of the chambers when necessary.

Another object of the invention is to provide a device of this character which is very efficient in its operation and comparatively simple in its construction.

With these and numerous other objects in view, my invention consists in the novel features of construction combination and arrangement of parts as will be hereinafter referred to and more particularly pointed out in the specification and claims.

The invention is illustrated in the accompanying drawings wherein:

Figure 1 is a top plan view of the improved oil recovering apparatus;

Figure 2 is a longitudinal sectional view taken along the line 2—2 of Figure 1;

Figure 3 is a longitudinal sectional view taken along the line 3—3 of Figure 1;

Figure 4 is a transverse sectional view taken along the line 4—4 of Figure 1;

Figure 5 is a transverse sectional view taken along the line 5—5 of Figure 1;

Figure 6 is a horizontal sectional view taken along the line 6—6 of Figure 4;

Figure 7 is a sectional view taken horizontally through the apparatus along the line 7—7 of Figure 4;

Figure 8 is a fragmentary sectional view taken vertically at the water outlet of the apparatus;

Figure 9 is a fragmentary sectional view taken along the line 9—9 of Figure 4, and showing on an enlarged scale the lower portion of one of a number of agitators mounted in the lower portion of the compartment into which the apparatus is divided.

This improved separating apparatus consists of a body or large tank 1 which is preferably formed of re-inforced concrete but may be formed of any material found suitable. It may be erected in a pit dug into the ground or may rest upon a suitable foundation. While the tank may be of any size desired and its dimensions varied when found necessary it will preferably be in the proportion of one hundred and twenty feet long, sixty feet wide and twenty feet deep. From the bottom 2 of the tank rise end walls 3 and 4, side walls 5, longitudinally extending partitions or walls 6 and a transversely extending partition or wall 7. These walls and partitions cooperate to form compartments 8, 9, 10, 11, 12 and 13 arranged as clearly shown in Figures 7 and 8 and vats 14 and 15. While the vats or oil storage tanks 14 and 15 are divided into end sections by the partition 7 openings 16 are formed through the partition substantially on a level with the bottom of the vat thereby establishing communication between their end portions and permitting oil to flow freely from one end portion of each vat to the other end portions thereof. By referring to Figures 4 and 5 it will be seen that the side walls 5 of the body or tank converge upwardly to adjacent the top of the tank and then parallel and the partitions 6 also extend at an incline transversely of the body to adjacent its upper end or top and then parallel to the upper portions of the side walls. Therefore, the wall 5 and the partitions or walls 6 cooperate to form vats having side walls converging downwardly and compartments or chambers 8 through 13 reduced in width towards their upper ends and terminating in mouths which have parallel side walls but are of a great deal less width than the width of the bottoms of the compartments. These compartments or chambers communicate with each other and by referring to Figures 4 and 5 it will be seen that a conduit 17 establishes communication between the compartments 8 and 9 and a similar conduit 18 establishes communication between the compartments 12 and 13 while passages 19 and 20 respectively establish communication between the compartments 9 and 10 and 11 and 12. An opening 21 formed in the partition 17 intermediate the height thereof establishes communication between the compartments 11 and 12. It should be noted that the passages 19 and 20 are formed through to the bottom of the compartments whereas the conduits 17 and 18 each has one end opening into a compartment near the bottom thereof and its other end opening into a compartment intermediate the depths thereof. Therefore, the oil laden water in addition to following a tortuous path through the separator will alternate its direction of flow vertically as it passes from one compartment to another. This will very effectively cause the water to flow quietly through the apparatus from one compartment to another and allow oil in the water to easily rise to the surface where it will accumulate in a mass supported by the water and not be liable to be agitated and again intermingle with the water. The conduits 17 and 18 in addition to insuring a quiet flow of water also serve to bring any heavy gravity oil to the surface of the water. This oil would have a tendency to remain at the bottom of the separator if it were not carried upwardly by passing through the conduits 17 and 18 and flow along the bottom of each compartment until it passed out through the outlet and into the river. This would cause loss of the heavy oil and also pollute the river. The upper end of the conduits 17 and 18 are preferably about sixteen inches below the normal water level whereas their lower ends are close to the bottoms of the compartments 8 and 12 and preferably about seventeen feet below the normal water level.

In order to deliver oil form the compartments 8 through 13 into the vats or tanks 14 and 15 there has been provided troughs 22 which extend longitudinally in the reduced upper portion or mouth of the compartments and are supported therein by pipes 23. Additional supporting means for the troughs may be provided if so desired. These pipes communicate with the troughs through the bottoms thereof and project through the partitions 6 into the vats or tanks 14 and 15 and it will be readily understood that oil flowing from the troughs through the pipes will accumulate in the vats and any water which may accidentally flow into the vats with the oil will settle to the bottoms of the vats and accumulate in the tapered lower portions thereof. The inlet 14 through which water containing waste oil, sand and other muck and dirt enters the separator communicates with the compartments 8 at the outer end thereof through the end wall 4 and the water after being freed from the oil and sediment leaves the separator through a discharge opening 25 at the outer end of the compartment 13. This discharge opening communicates with a chamber 26 having a drain outlet 27 from which a pipe will lead to a sewer or river and the outer wall of the chamber 26 has its upper portion formed with an overflow outlet 26', the lower edge of which is one foot below the normal water level of the separator. An open channel or pipe may lead from this overflow 26' to a sewer or river. In order to control flow of water through the passages 25 and 27, there has been provided gate valves 28 and 29 having control rods 30 and 31. The valve 29 is closed except when it is necessary to drain the separator. By properly adjusting the valve 28, flow of water into and out of the separator may be equalized thereby maintaining a constant level in the chambers and allowing oil in the water to have ample time to rise before the water passes out of the chamber 13 into the tide chamber and also allowing sand and other sediment to settle in the pockets 32 formed in the bottom of the compartments 8 through 13. The level of the water in the chambers 8 through 13 is only about an inch below the upper edges of the troughs or pans 22 and therefore, oil which accumulates upon the water will soon rise to a level at which it can overflow into the pans and from these pans through the pipes 23 into the vats. About two weeks' time is usually necessary to fill the vats.

By closing the valve 28 sufficiently to reduce the normal flow of water through the separator the level of the water in the compartments may be raised until the oil all flows into the troughs for delivery into the storage vats. The valve 29 can then be opened and the water drained from the separator. If the valve 29 should not be closed soon enough and a certain amount of water enters the troughs with the oil and passes into the storage vats, this water will settle to the bottoms of the storage vats.

In order to withdraw oil from the vats there has been provided a pipe 33 leading from a suitable pump and having branch pipes 34 controlled by valves 35. These branch pipes enter the vats through the end wall 3 at one end of the body and terminate close to the bottom wall of the vat. At the other end of the body, there has been provided pipes 36 through which water which has accumulated in the vats is to be removed. These pipes which are controlled by valves 37 enter a box 38 and are united by an elbow 39. A drain pipe 40 leads from the box 38. Flow of water through the pipes 36 is caused by gravity as the level of the oil in the vats when they are full is higher than the discharge ends of these pipes and the difference in these levels will cause water in the bottoms of the vats to be forced out through the pipes 36 when the valves 37 are opened. As soon as oil flows out of the elbow the valves 37 will be again closed and the oil then withdrawn through the pipes 34. The valves 37 are always kept closed except when water is to be removed from the storage vats.

The oil laden water which enters the separator through the inlet 24 contains sand and other muck known as sludge in the oil industry. This material which may be referred to as sediment gradually settles in the bottom of the compartments 8 through 13 and in order to accommodate it the bottom of each compartment has been formed into a series of pockets 32 as previously stated, each having its passages converging towards a sump at its center.

Pipes 42 leading from one or more sand sucker pumps enter the compartments through the side walls 5 and one of the partitions or walls 6 as shown in Figures 4 and 5 and these pipes which are probably six inches in diameter extend downwardly into the compartments and terminate in vertically disposed lower end portions axial alined with the sumps 41. A sleeve 43 is rotatably disposed about the lower end portion of each pipe and carries a gear 44 so that rotary motion may be transmitted to the sleeve. These gears mesh with smaller gears 45 fixed to the lower end of rods or shafts 46 disposed vertically in the compartments with their upper ends projecting out of the compartments at the sides of the troughs 22 and at their upper ends the rods or shafts are equipped with hand wheels 47 by means of which they may be turned in order to rotate the sleeves.

Agitator arms extends from the lower end of each sleeve in radiating relation thereto and are bent as shown in Figures 4 and 5 so that they may move without interference by contact with the surfaces of the pockets. It will thus be seen that when it is necessary to remove the slush or sediment from the pocket the agitators may be turned by means of the rods or shafts 46 thereby loosening the sediment sufficiently to permit it to be drawn into the pipes 42 through their lower ends and pumped through the pipe out of the compartments. It will thus be seen that the device will serve not only as means for permitting oil to be pumped from water but also serve very effectively to remove sand and other sediment from the oil laden water and clear the water to such an extent that it may be delivered into a sewer or river or other body of water without danger of contaminating the river. Equalizer pipes 50 connect the vats so that oil may flow from one vat to the other and cause the oil in the two vats to maintain an even level.

From the foregoing description of the construction of my improved device the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described my invention what I claim is:

1. Apparatus for recovering waste oil comprising a series of settling chambers having combination with each other whereby oil laden water may flow from one chamber to another, oil storage vats located between pairs of chambers and out of communication with the chambers, receptacles in the upper portion of said chambers open at their tops and having outlet pipes leading from their bottoms into the vats for delivering oil into said vats, and means for controlling flow of water through said chambers whereby the level of water in the chambers may be raised and oil floating thereon caused to enter said receptacles for delivery to said vats.

2. Apparatus for recovering waste oil comprising a series of settling chambers and storage vats between the chambers, said chambers having communication with each other whereby oil laden water may flow from one chamber to another, certain of said chambers having communication with succeeding chambers through passages extending transversely beneath a vat opening into the chambers at opposite sides thereof through the bottoms thereof and other chambers communicating with succeeding chambers through passages leading from one chamber near the bottom thereof and extending through a vat transversely thereof opening into another chamber a short distance below the normal water level thereof whereby the water follows a tortuous path as it passes through the chambers and allow ample time for oil to rise to the surface of water in the chambers, oil collecting receptacles in said chambers above the normal water level and open at their tops, pipes leading from said receptacles for delivering oil from the receptacles to the storage vats and means for controlling flow of water through said chambers whereby the level of water in the chambers may be raised and oil floating thereon caused to enter said receptacle for delivery to said vats.

3. Apparatus for recovering waste oil comprising a series of settling chambers, adjoining chambers having their end portions communicating with each other whereby oil laden water travels in a toruous path through the chambers and oil rises to form bodies of oil in upper portions of the chambers, a pan in the upper portion of each chamber, and means to control flow of water through said chambers whereby the level of water in the chambers may be temporarily raised and oil caused to flow into said pans, sediment removing pipes extending into said chambers and having their inner ends terminating adjacent the bottoms of the chambers, and means for agitating sediment rotatably mounted upon inner end portions of said pipes and having actuating means projecting out of the chambers.

4. Apparatus for recovering waste oil comprising a series of settling chambers adjoining chambers having communication with each other whereby oil laden water travels in a tortuous path through the chambers, and oil rises to form bodies of oil in upper portions of the chambers, a pan in the upper portion of each chamber and means to control flow of water through said chambers whereby the level of water in the chambers may be temporarily raised and oil caused to flow into said pans, sediment removing pipes extending to said chambers and having vertically disposed inner end portions extending into sediment receiving pockets formed in the bottoms of the chambers, agitators rotatably mounted upon the inner ends of said pipes, and actuating shafts for said agitators projecting upwardly out of the chambers.

5. Apparatus for recovering waste oil comprising a body having a bottom and side and end walls, partitions extending longitudinally of said body and together with the side walls defining a series of separating chambers tapered upwardly in cross section, and oil receiving vats between the separating chambers tapered downwardly in cross section, each chamber and vat having its upper portion of an even width, pans in the upper portions of said chambers open at their tops and having discharge pipes for delivering oil from the pans into said vats, adjoining chambers having communication with each other whereby oil laden water may flow through the chambers, and means for regulating flow of water whereby the level of water in the chambers may be temporarily raised and oil floating upon the water caused to flow into said pans.

6. Apparatus for recovering waste oil comprising a body having a bottom and side and end walls, partitions in said body dividing the same into a series of settling chambers and oil receiving vats between the chambers, pans in upper portions of said chambers having discharge pipes for delivering oil into said vats, adjoining chambers having communication with each other whereby oil laden water may flow through the chambers and means for regulating flow of water whereby the level of water in the chambers may be temporarily raised and oil floating upon the water caused to flow into said pans.

7. Apparatus for recovering waste oil comprising a body having a bottom and side and end walls, partitions in said body dividing the same into a series of settling chambers and oil receiving vats between the chambers, pans in upper portions of said chambers having discharge pipes for delivering oil into said vats, passages being provided between adjoining chambers whereby oil laden water may flow through the chambers, certain of said passages opening through bottoms of the chambers connected thereby and the others each leading from adjacent the bottom of one chamber and opening into a succeeding chamber a short distance below the normal water level thereof whereby water passing through the chambers follows a tortuous path and means for regulating flow of water whereby the level of water in the chambers may be temporarily raised and oil floating upon the water caused to flow into said pans.

8. Apparatus for recovering waste oil comprising a body having a bottom and side and end walls, partitions in said body dividing the same into a series of settling chambers and oil receiving vats between the chambers, pans in upper portions of said chambers having discharge pipes for delivering oil into said vats, passages being provided between adjoining chambers whereby oil laden water may flow through the chambers, means for removing sediment from the bottoms of said chambers, and means for regulating flow of water whereby the level of water in the chambers may be temporarily raised and oil floating upon the water caused to flow into said pans.

9. Apparatus for recovering waste oil comprising a body having a bottom and side and end walls, partitions in said body dividing the same into a series of settling chambers and oil receiving vats between the chambers, pans in upper portions of said chambers having discharge pipes for delivering oil into said vats, passages being provided between adjoining chambers whereby oil laden water may flow through the chambers, the bottoms of said chambers being formed with sediment receiving pockets, pipes for extracting sediment extending into said chambers and having their inner ends disposed vertically in the pockets, agitators carried by the inner end portions of said pipes, actuating means for said agitators extending through the upper portions of the chambers, and means for regulating flow of water whereby the level of water in the chambers may be temporarily raised and oil floating upon the water caused to flow into said pans.

10. Apparatus for recovering waste oil comprising a body having a bottom and side and end walls, partitions in said body dividing the same into a series of settling chambers and oil receiving vats between the chambers, pans in upper portions of said chambers having discharge pipes for delivering oil into said vats, passages being provided between adjoining chambers whereby oil laden water may flow through the chambers, means for removing water from the bottom of said vats, means for extracting oil from the vats, and means for regulating flow of water whereby the level of water in the chambers may be temporarily raised and oil floating upon the water caused to flow into said pans.

In testimony whereof I affix my signature.

WILLIAM UMONT.